US010077048B2

(12) United States Patent
Nagae et al.

(10) Patent No.: US 10,077,048 B2
(45) Date of Patent: Sep. 18, 2018

(54) LANE DEPARTURE PREVENTION APPARATUS

(71) Applicant: TOYOTA JIDOSHA KABUSHIKI KAISHA, Toyota-shi, Aichi-ken (JP)

(72) Inventors: Akira Nagae, Susono (JP); Ryo Inomata, Ashigarakami-gun (JP); Hironori Ito, Susono (JP); Masayuki Ikeda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/850,850

(22) Filed: Dec. 21, 2017

(65) Prior Publication Data

US 2018/0215379 A1    Aug. 2, 2018

(30) Foreign Application Priority Data

Feb. 1, 2017    (JP) ................ 2017-016612

(51) Int. Cl.
  *B60W 10/12*    (2012.01)
  *B60W 30/12*    (2006.01)
  *B60W 10/184*   (2012.01)

(52) U.S. Cl.
  CPC ........... *B60W 30/12* (2013.01); *B60W 10/12* (2013.01); *B60W 10/184* (2013.01); *B60W 2710/12* (2013.01); *B60W 2710/18* (2013.01); *B60W 2720/14* (2013.01)

(58) Field of Classification Search
  CPC .... B60W 30/12; B60W 10/12; B60W 10/184; B60W 2710/12; B60W 2710/18; B60W 2720/14

USPC ........................................................ 701/48
See application file for complete search history.

(56) References Cited

U.S. PATENT DOCUMENTS

| 2007/0255474 A1* | 11/2007 | Hayakawa .......... B60T 8/17551 701/70 |
| 2012/0109415 A1* | 5/2012 | Nitta .................... B60T 8/17557 701/1 |
| 2018/0029593 A1* | 2/2018 | Kozuka ................. B60W 30/09 |
| 2018/0043870 A1* | 2/2018 | Nagae ................. B60T 8/17557 |

FOREIGN PATENT DOCUMENTS

| JP | 10-081217 A | 3/1998 |
| JP | 2006-282168 A | 10/2006 |

* cited by examiner

*Primary Examiner* — Yazan A Soofi
(74) *Attorney, Agent, or Firm* — Sughrue Mion, PLLC (57) ABSTRACT

A lane departure prevention apparatus (17) has: a departure preventing device (172) for control a braking apparatus (122) to perform a departure prevention operation by applying yaw moment ($M_{tgt}$) to a vehicle (1), wherein the yaw moment is generated by a difference of the braking forces between right wheels (121FR, 121RR) and left wheels (121FL, 121RL)1; and a controlling device (173) for controlling the departure prevention device so that the braking force applied to driving wheels (121RL, 121RR) becomes smaller and the braking force applied to non-driving wheels (121FL, 121FR) becomes larger when the departure prevention operation is performed and a differential apparatus (132) limits a differential rotation, compared to a case where the departure prevention operation is performed and the differential apparatus does not limit the differential rotation.

2 Claims, 4 Drawing Sheets

LANE DEPARTURE PREVENTION APPARATUS

TECHNICAL FIELD

The present invention relates to a technical field of a lane departure prevention apparatus that is configured to prevent a vehicle from departing from a driving lane on which the vehicle is currently traveling.

BACKGROUND ART

A lane departure prevention apparatus disclosed in a Patent Literature 1 is known as one example of a lane departure apparatus. The lane departure prevention apparatus disclosed in the Patent Literature 1 is configured to apply, to a vehicle, yaw moment for preventing the vehicle from departing from a driving lane by controlling braking force applied to a wheel (i.e. a tire), if there is a possibility that the vehicle departs from the driving lane.

Moreover, although a Patent Literature 2 does not disclose the lane departure prevention apparatus, the Patent Literature 2 is related to the present invention. The Patent Literature 2 discloses a vehicle that has a first differential apparatus including a first mechanism (a center differential lock mechanism in the Patent Literature 2) that is configured to limit a differential rotation between front wheels and rear wheels by directly driving the front wheels and the rear wheels selectively.

CITATION LIST

Patent Literature

[Patent Literature 1] Japanese Unexamined Patent Application Publication No. 2006-282168
[Patent Literature 2] Japanese Unexamined Patent Application Publication No. H10-081217

SUMMARY OF INVENTION

Technical Problem

There is also a vehicle that has a second differential apparatus including a second mechanism that is configured to limit a differential rotation between a right driving wheel that is arranged at a right side of the vehicle and a left driving wheel that is arranged at a left side of the vehicle, in addition to or instead of the first mechanism that is configured to limit the differential rotation between the front wheels and the rear wheels. If the above described lane departure prevention apparatus is adapted to this vehicle having the second differential apparatus, the following technical problem occurs.

Specifically, the lane departure prevention apparatus prevents the vehicle from departing from the driving lane by applying, to the vehicle, the yaw moment that is generated by a difference of the braking forces between right wheels including the right driving wheel (namely, wheels that are arranged at the right side of the vehicle) and left wheels including the left driving wheel (namely, wheels that are arranged at the left side of the vehicle). However, if the second differential apparatus limits the differential rotation between the right driving wheel and the left driving wheel, applying the braking force to either one of the right driving wheel and the left driving wheel results in applying the braking force to the other one of the right driving wheel and the left driving wheel. In this case, there is a possibility that the difference of the braking forces is different from a desired value.

Specifically, the lane departure prevention apparatus is allowed to use, as a method of applying the yaw moment generated by the difference of the braking forces to the vehicle, a first method of applying the braking force to either one of the right driving wheel and the left driving wheel and not applying the braking force to the other one of the right driving wheel and the left driving wheel. In this case, if the differential rotation between the right driving wheel and the left driving wheel is limited, the braking force is applied to the other one of the right driving wheel and the left driving wheel even if the lane departure prevention apparatus performs only a control for applying the braking force to either one of the right driving wheel and the left driving wheel. Thus, there is a possibility that the difference of the braking forces is different from the desired value.

Alternatively, the lane departure prevention apparatus is allowed to use, as the method of applying the yaw moment generated by the difference of the braking forces to the vehicle, a second method of applying the first braking force to either one of the right driving wheel and the left driving wheel and applying the second braking force to the other one of the right driving wheel and the left driving wheel, wherein the magnitude of the first braking force is different from the magnitude of the second braking force. In this case, if the differential rotation between the right driving wheel and the left driving wheel is limited, not only the first braking force but also a third braking force are applied to either one of the right driving wheel and the left driving wheel even if the lane departure prevention apparatus performs a control for applying the first braking force to either one of the right driving wheel and the left driving wheel, wherein the third braking force is generated by a control for applying the second braking force to the other one of the right driving wheel and the left driving wheel. Similarly, not only the second braking force but also a fourth braking force are applied to the other one of the right driving wheel and the left driving wheel even if the lane departure prevention apparatus performs the control for applying the second braking force to the other one of the right driving wheel and the left driving wheel, wherein the fourth braking force is generated by the control for applying the first braking force to either one of the right driving wheel and the left driving wheel. Thus, there is a possibility that the difference of the braking forces is different from the desired value.

If the difference of the braking forces is different from the desired value, there is a possibility that the lane departure prevention apparatus is not capable of applying, to the vehicle, the desired yaw moment for preventing the vehicle from departing from the driving lane. As a result, there is a possibility that the lane departure preventing apparatus is not capable of preventing the vehicle from departing from the driving lane, which is a technical problem.

The above described technical problem is one example of the technical problem to be solved by the present invention. It is therefore an object of the present invention to provide, for example, a lane departure prevention apparatus that is configured to appropriately perform a departure prevention operation for preventing a vehicle having the differential apparatus from departing from the driving lane.

Solution to Problem

<1>

One aspect of a lane departure prevention apparatus is configured to perform a departure prevention operation for preventing a vehicle from departing from a driving lane on which the vehicle is currently traveling, the vehicle includes: a plurality of wheels that includes a right driving wheel, a left driving wheel, a right non-driving wheel and a left non-driving wheel, each of the right driving wheel and the left driving wheel is a driving wheel to which a driving power is transmitted from a power source, each of the right non-driving wheel and the left non-driving wheel is a non-driving wheel to which the driving power is not transmitted from the power source; a braking apparatus that is configured to apply braking force to each of the plurality of wheels; and a differential apparatus that is configured to allow a differential rotation between the right driving wheel and the left driving wheel and to limit the differential rotation when a specific condition is satisfied, the lane departure apparatus includes a controller, the controller is programmed to: control the braking apparatus to perform the departure prevention operation by applying yaw moment to the vehicle, the yaw moment being generated by a difference of the braking forces between right wheels and left wheels, the right wheels including the right driving wheel and the right non-driving wheel, the left wheels including the left driving wheel and the left non-driving wheel; and control a first ratio that is a ratio of the braking force applied to the driving wheels with respect to the braking force applied to the vehicle and a second ratio that is a ratio of the braking force applied to the non-driving wheels with respect to the braking force applied to the vehicle so that the first ratio becomes smaller and the second ratio becomes larger when the departure prevention operation is performed and the differential apparatus limits the differential rotation, compared to a case where the departure prevention operation is performed and the differential apparatus does not limit the differential rotation.

Alternatively, one aspect of a lane departure prevention apparatus may be configured to perform a departure prevention operation for preventing a vehicle from departing from a driving lane on which the vehicle is currently traveling, the vehicle includes: a plurality of wheels that includes a right driving wheel, a left driving wheel, a right non-driving wheel and a left non-driving wheel, each of the right driving wheel and the left driving wheel is a driving wheel to which a driving power is transmitted from a power source, each of the right non-driving wheel and the left non-driving wheel is a non-driving wheel to which the driving power is not transmitted from the power source; a braking apparatus that is configured to apply braking force to each of the plurality of wheels; and a differential apparatus that is configured to allow a differential rotation between the right driving wheel and the left driving wheel and to limit the differential rotation when a specific condition is satisfied, the lane departure apparatus includes: a departure preventing device that is configured to control the braking apparatus to perform the departure prevention operation by applying yaw moment to the vehicle, the yaw moment being generated by a difference of the braking forces between right wheels and left wheels, the right wheels including the right driving wheel and the right non-driving wheel, the left wheels including the left driving wheel and the left non-driving wheel; and a controlling device that is configured to control the departure prevention device so that a first ratio that is a ratio of the braking force applied to the driving wheels with respect to the braking force applied to the vehicle becomes smaller and a second ratio that is a ratio of the braking force applied to the non-driving wheels with respect to the braking force applied to the vehicle becomes larger when the departure prevention operation is performed and the differential apparatus limits the differential rotation, compared to a case where the departure prevention operation is performed and the differential apparatus does not limit the differential rotation.

According to one aspect of the lane departure prevention apparatus, the first ratio that is the ratio of the braking force applied to the driving wheels decreases (namely, becomes smaller) when the differential rotation is limited. Thus, the braking force that is smaller than desired braking force (namely, the braking force that should be applied when the differential rotation is not limited) necessary to perform the departure prevention operation is applied to either one of the right driving wheel and the left driving wheel. Thus, undesired braking force that is large to prevent the desired departure prevention operation is not likely applied to the other one of the right driving wheel and the left driving wheel.

On the other hand, when the differential rotation is limited, the braking force applied to the vehicle decreases if no measurement is taken, because the first ratio decreases (namely, because the braking force applied to the driving wheels decreases). Therefore, there is a possibility that the desired difference of the braking forces is not generated, if no measurement is taken. Thus, one aspect of the lane departure prevention apparatus increases the second ratio that is the ratio of the braking force applied to the non-driving wheels, in order to generate the desired difference of the braking forces by compensating the decrease of the braking force applied to the driving wheels. The non-driving wheels is not affected by the limitation of the differential rotation by the differential apparatus. Thus, applying the braking force to either one of the right non-driving wheel and the left non-driving wheel does not result in applying the braking force to the other one of the right non-driving wheel and the left non-driving wheel. Thus, the lane departure prevention apparatus is allowed to increase the braking force applied to the non-driving wheels without being affected by the limitation of the differential rotation by the differential apparatus so that the decrease of the braking force applied to the driving wheels is compensated and thus the desired difference of the braking forces is generated.

Therefore, one aspect of the lane departure prevention apparatus is allowed to appropriately perform the departure prevention operation for preventing the vehicle having the differential apparatus from departing from the driving lane.

<2>

In another aspect of the above described lane departure prevention apparatus, the controller is further programmed to control the first ratio and the second ratio so that the first ratio becomes smaller and the second ratio becomes larger as the differential apparatus limits the differential rotation more greatly.

Alternatively, in another aspect of the above described lane departure prevention apparatus that includes the controlling device, the controlling device may controls the departure prevention device so that the first ratio becomes smaller and the second ratio becomes larger as the differential apparatus limits the differential rotation more greatly.

According to this aspect, the lane departure prevention apparatus is allowed to appropriately perform the departure prevention operation for preventing the vehicle having the differential apparatus from departing from the driving lane on the basis of the degree of the limitation of the differential rotation by the differential apparatus.

DESCRIPTION OF EMBODIMENTS

In the following description, with reference to drawings, one embodiment of a lane departure prevention apparatus of the present invention will be described. In the following description, a vehicle 1 to which one embodiment of the lane departure prevention apparatus of the present invention is adapted will be described.

(1) Structure of Vehicle 1

Figure 1:
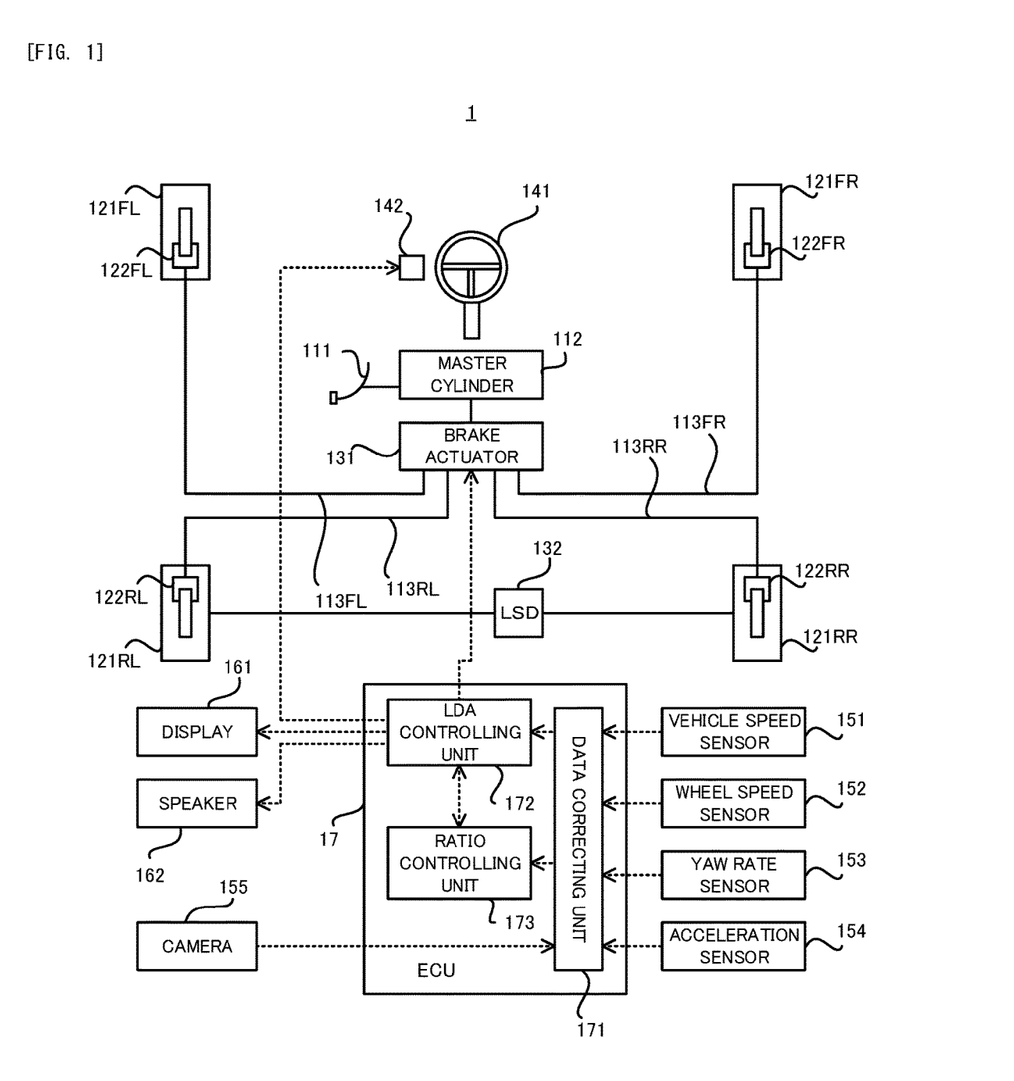
FIG. 1 is a block diagram that illustrates a structure of a vehicle of the present embodiment.

Firstly, with reference to a block diagram that is illustrated in FIG. 1, the structure of the vehicle 1 of the present embodiment will be explained. As illustrated in FIG. 1, the vehicle 1 has: a brake pedal 111; a master cylinder 112; a brake pipe 113FL; a brake pipe 113RL; a brake pipe 113FR; a brake pipe 113RR; a left front wheel 121FL; a left rear wheel 121RL; a right front wheel 121FR; a right rear wheel 121RR; a wheel cylinder 122FL; a wheel cylinder 122RL; a wheel cylinder 122FR; a wheel cylinder 122RR; a brake actuator 131 that is one specific example of the above described "braking apparatus"; a LSD (Limited Slip Differential) 132 that is one specific example of the above described "differential apparatus"; a steering wheel 141, a vibration actuator 142; a vehicle speed sensor 151; a wheel speed sensor 152; a yaw rate sensor 153; an acceleration sensor 154; a camera 155; a display 161; a speaker 162; and an ECU (Electronic Control Unit) 17 that is one example of the above described "lane departure prevention apparatus".

The brake pedal 111 is a pedal that is pedaled by a driver to brake the vehicle 1. The master cylinder 112 is configured to adjust pressure of brake fluid (alternatively, any fluid) in the master cylinder 112 so that the pressure of the brake fluid is equal to pressure based on a pedaled amount of the brake pedal 111. In the following description, the pressure of the brake fluid is referred to as a "hydraulic pressure", for the convenience of simple description. The hydraulic pressure in the master cylinder 112 is transmitted to the wheel cylinder 122FL, the wheel cylinder 122RL, the wheel cylinder 122FR and the wheel cylinder 122RR through the brake pipe 113FL, the brake pipe 113RL, the brake pipe 113FR and the brake pipe 113RR, respectively. Thus, the braking forces based on the hydraulic pressure transmitted to the wheel cylinder 122FL, the wheel cylinder 122RL, the wheel cylinder 122FR and the wheel cylinder 122RR are applied to the left front wheel 121FL, the left rear wheel 121RL, the right front wheel 121FR and the right rear wheel 121RR, respectively.

The brake actuator 131 is configured to adjust the hydraulic pressure transmitted to each of the wheel cylinder 122FL, the wheel cylinder 122RL, the wheel cylinder 122FR and the wheel cylinder 122RR under the control of the ECU 17, independently from the pedaled amount of the brake pedal 111. Therefore, the brake actuator 131 is configured to adjust the braking force applied to each of the left front wheel 121FL, the left rear wheel 121RL, the right front wheel 121FR and the right rear wheel 121RR, independently from the pedaled amount of the brake pedal 111.

In the present embodiment, the vehicle 1 is a rear wheel drive vehicle. Thus, each of the left rear wheel 121RL and the right rear wheel 121RR is a driving wheel to which a driving power (in other words, a driving force) is transmitted from a power source (for example, at least one of an engine, a motor and the like). Each of the left front wheel 121FL and the right front wheel 121FR is a non-driving wheel to which the driving power is not transmitted from the power source.

The LSD 132 is a differential apparatus that is configured to absorb a difference of the number of rotations between the left rear wheel 121RL and the right rear wheel 121RR by allowing the differential rotation between the left rear wheel 121RL and the right rear wheel 121RR. In the following description, the "differential rotation" means the differential rotation between the left rear wheel 121RL and the right rear wheel 121RR, if there is no particular note. Moreover, the LSD 132 is configured to limit the differential rotation when a specific condition is satisfied. A state where the differential rotation is limited in the present embodiment means not only a state where the differential rotation is perfectly or completely limited (namely, a state where the left rear wheel 121RL and the right rear wheel 121RR are directly connected by the LSD 132 and thus the differential rotation is forbidden) but also a state where the differential rotation is limited more than the case where the differential rotation is allowed. Note that an existing condition or a conventionally used condition may be used as the specific condition that should be satisfied when the LSD 132 limits the differential rotation and thus the detailed description of the specific condition will be omitted.

The steering wheel 141 is an operational device that is operated by the driver to steer the vehicle 1 (namely, to turn turned wheels). Note that each of the left front wheel 121FL and the right front wheel 121FR corresponds to the turned wheel in the present embodiment. The vibration actuator 142 is configured to vibrate the steering wheel 141 under the control of the ECU 17.

The vehicle speed sensor 151 is configured to detect vehicle speed Vv of the vehicle 1. The wheel speed sensor 152 is configured to detect wheel speed Vw of each of the left front wheel 121FL, the left rear wheel 121RL, the right front wheel 121FR and the right rear wheel 121RR. The yaw rate sensor 153 is configured to detect yaw rate γ of the vehicle 1. The acceleration sensor 154 is configured to detect acceleration G (specifically, acceleration Gx in a longitudinal direction (in other words, a front-back direction) and acceleration Gy in a lateral direction (in other words, a right-left direction)) of the vehicle 1. The camera 155 is an imaging device that is configured to capture a circumstance in front of the vehicle 1. Detection data that represents the detection result of the vehicle speed sensor 151 to the acceleration sensor 154 and image data that represents an image captured by the camera 155 are outputted to the ECU 17.

The display 161 is configured to display any information under the control of the ECU 17. The speaker 162 is configured to output any sound under the control of the ECU 17.

The ECU 17 is configured to control entire operation of the vehicle 1. Especially in the present embodiment, the ECU 17 is configured to perform a departure prevention operation for preventing the vehicle 1 from departing (in other words, deviating) from a driving lane on which the vehicle 1 is currently traveling (in other words, moving). Therefore, the ECU 17 is configured to function as a controlling apparatus for realizing what we call LDA (Lane Departure Alert) or LDP (Lane Departure Prevention).

In order to perform the departure prevention operation, the ECU 17 includes, as processing blocks that are logically realized in the ECU 17 or processing circuits that are physically realized in the ECU 17, a data correcting unit 171, a LDA controlling unit 172 that is one specific example of the above described "departure preventing device" and a ratio controlling unit 173 that is one specific example of the above described "controlling device". Although an operation of each of the data correcting unit 171, the LDA controlling unit 172 and the ratio controlling unit 173 will be described later in detail with reference to FIG. 2 and so on, overview of the operation will be briefly described here. The data correcting unit 171 is configured to correct the detection data that represents the detection result of the vehicle speed sensor 151 to the acceleration sensor 154 and the image data that represents the image captured by the camera 155. The LDA controlling unit 172 is configured to control the brake actuator 131 on the basis of the detection data and the image data corrected by the data correcting unit 171 so that the prevention yaw moment that is allowed to prevent the vehicle 1 from departing from the driving lane is applied to the vehicle 1 by using the braking force applied to at least one of the left front wheel 121FL, the left rear wheel 121RL, the right front wheel 121FR and the right rear wheel 121RR, if there is a possibility that the vehicle 1 departs from the driving lane on which the vehicle 1 is currently traveling. Note that "preventing the vehicle 1 from departing from the driving lane" in the present embodiment means allowing a distance by which the vehicle 1 actually departs from the driving lane when the prevention yaw moment is applied to be smaller than a distance by which the vehicle 1 is predicted to depart from the driving lane when the prevention yaw moment is not applied. The ratio controlling unit 173 is configured to control (for example, adjust or set) a ratio r1 and a ratio r2 on the basis of an aspect (for example, a degree) of the limitation of the differential rotation by the LSD 132, when the prevention yaw moment is applied to the vehicle 1. The ratio r1 is a ratio of the braking force applied to the driving wheels (namely, the left rear wheel 121RL and the right rear wheel 121RR) with respect to the braking force applied to the vehicle 1. The ratio r1 is one specific example of the above described "first ratio". The ratio r2 is a ratio of the braking force applied to the non-driving wheels (namely, the left front wheel 121FL and the right front wheel 121FR) with respect to the braking force applied to the vehicle 1. The ratio r2 is one specific example of the above described "second ratio".

(2) Detail of Departure Prevention Operation in Present Embodiment

Next, with reference to a flowchart illustrated in FIG. 2, the lane departure prevention operation performed by the ECU 17 will be described.

Figure 2:
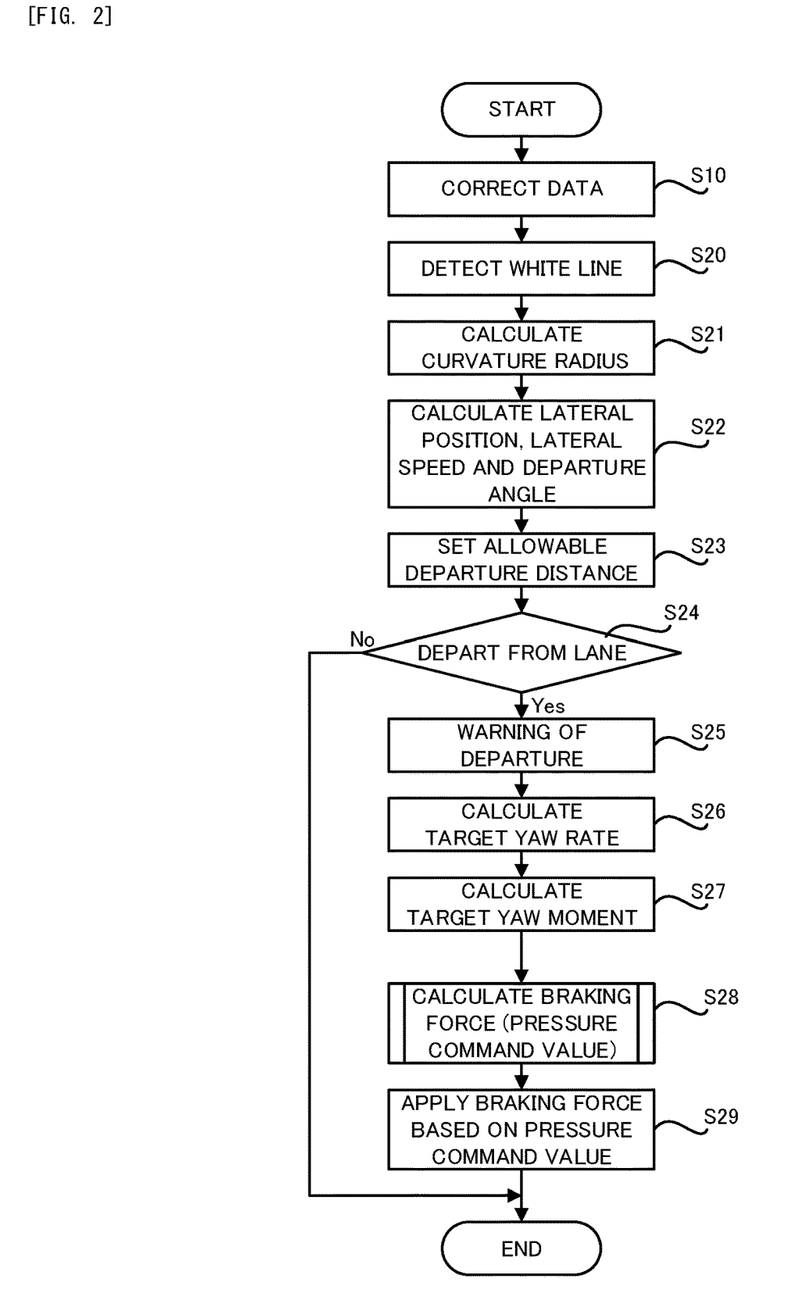
FIG. 2 is a flowchart that illustrates a flow of a departure prevention operation in the present embodiment.

As illustrated in FIG. 2, firstly, the data correcting unit 171 corrects the detection data that represents the detection result of the vehicle speed sensor 151 to the acceleration sensor 154 and the image data that represents the image captured by the camera 155 (a step S10).

Then, the LDA controlling unit 172 detects, in the image captured by the camera 155, a lane edge (in the present embodiment, a white line is used as one example of the lane edge) of the driving lane on which the vehicle 1 is currently traveling by analyzing the image data corrected at the step S10 (a step S20).

Then, the LDA controlling unit 172 calculates curvature radius R of the driving lane on which the vehicle 1 is currently traveling on the basis of the white line detected at the step S20 (a step S21). Note that the curvature radius R of the driving lane is substantially equivalent to curvature radius of the white line. Thus, the LDA controlling unit 172 may calculate the curvature radius of the white line detected at the step S20 and may use the calculated curvature radius as the curvature radius R of the driving lane. However, the LDA controlling unit 172 may calculate the curvature radius R of the driving lane on which, the vehicle 1 is currently traveling by using positional information that is detected by a GPS (Global Positioning System) and map information that is used for a navigation operation.

Furthermore, the LDA controlling unit 172 calculates a current lateral position X of the vehicle 1 on the basis of the white line detected at the step S20 (step S22). The "lateral position X" in the present embodiment represents a distance from a center of the driving lane to the vehicle 1 (typically, to a center of the vehicle 1) along a lane width direction that is perpendicular to a direction along which the driving lane extends (namely, a lane extending direction). In this case, it is preferable that either one of a direction from the center of the driving lane toward a right side and a direction from the center of the driving lane toward a left side be set to a positive direction and the other one of the direction from the center of the driving lane toward the right side and the direction from the center of the driving lane toward the left side be set to a negative direction. Same argument can be applied to below described lateral speed V1, the above described yaw moment such as the prevention yaw moment, the above described acceleration Gy, the above described yaw rate γ and so on.

Furthermore, the LDA controlling unit 172 calculates a departure angle (a deviation angle) θ of the vehicle 1 on the basis of the white line detected at the step S20 (a step S22). The "departure angle θ" in the present embodiment represents an angle between the driving lane and a longitudinal axis of the vehicle 1 (namely, an angle between the white line and the longitudinal axis of the vehicle 1).

Furthermore, the LDA controlling unit 172 calculates the lateral speed V1 of the vehicle 1 on the basis of time-sequential data of the lateral position X of the vehicle 1 calculated from the white line (the step S22). However, the LDA controlling unit 172 may calculate the lateral speed V1 of the vehicle 1 on the basis of the detection result of the vehicle speed sensor 151 and the calculated departure angle θ and/or the detection result of the acceleration sensor 154. The "lateral speed V1" in the present embodiment represents the speed of the vehicle 1 along the lane width direction.

Furthermore, the LDA controlling unit 172 sets an allowable departure distance D (a step S23). The allowable departure distance D represents an allowable maximum value of a distance by which the vehicle 1 departs from the driving lane (namely, a distance by which the vehicle 1 departs from the white line) when the vehicle 1 departs from the driving lane. Therefore, the lane departure prevention operation is an operation for applying the prevention yaw moment so that the distance by which the vehicle 1 departs from the driving lane is within the allowable departure distance D.

The LDA controlling unit 172 may set the allowable departure distance D from a viewpoint of satisfying the requirement of the law or the like (for example, the requirement of NCAP (New Car Assessment Programe)). In this case, the allowable departure distance D that is set from the viewpoint of satisfying the requirement of the law or the like may be used as a default allowable departure distance D.

Then, the LDA controlling unit 172 determines whether or not there is a possibility that the vehicle 1 departs from the driving lane on which the vehicle 1 is currently traveling (step S24). Specifically, the LDA controlling unit 172 calculates a future lateral position Xf. For example, the LDA controlling unit 172 calculates, as the future lateral position Xf, the lateral position X at the timing when the vehicle 1 will have moved by a distance corresponding to a front watching distance (a look ahead distance) from the current position. The future lateral position Xf can be calculated by adding to (or subtracting from) the current lateral position X a value obtained by multiplying the lateral speed V1 and a time Δt that is necessary for the vehicle 1 to move by the front watching distance. Then, the LDA controlling unit 172 determines whether or not an absolute value of the future lateral position Xf is equal to or larger than a departure threshold value. If the vehicle 1 is parallel to the lane extending direction, the departure threshold value is a value that is determined on the basis of a width of the driving lane and a width of the vehicle 1, for example. Specifically, the departure threshold value is "(the width of the driving lane−the width of the vehicle 1)/2". In this case, a situation where the absolute value of the future lateral position Xf is equal to the departure threshold value corresponds to a situation where a side surface of the vehicle 1 (for example, one of side surfaces of the vehicle 1 that is not closer to the center of the driving lane) along the lane width direction is on the white line. A situation where the absolute value of the future lateral position Xf is larger than the departure threshold value corresponds to a situation where the side surface of the vehicle 1 (for example, one of the side surfaces of the vehicle 1 that is not closer to the center of the driving lane) along the lane width direction is outside the white line. Thus, if the absolute value of the future lateral position Xf is not equal to or larger than the departure threshold value, the LDA controlling unit 172 determines that there is no possibility that the vehicle 1 departs from the driving lane on which the vehicle 1 is currently traveling. On the other hand, if the absolute value of the future lateral position Xf is equal to or larger than the departure threshold value, the LDA controlling unit 172 determines that there is a possibility that the vehicle 1 departs from the driving lane on which the vehicle 1 is currently traveling. However, the vehicle 1 may not be parallel to the lane extending direction, and thus any value that is different from the above described value may be used as the departure threshold value.

Note that the above described operation is one example of the operation for determining whether or not there is a possibility that the vehicle 1 departs from the driving lane on which the vehicle 1 is currently traveling. Therefore, the LDA controlling unit 172 may determine whether or not there is a possibility that the vehicle 1 departs from the driving lane on which the vehicle 1 is currently traveling, by using another determining method. Note that a situation where the vehicle 1 will get across or will be on the white line in near future (for example, at the timing when the vehicle 1 will have moved by the distance corresponding to the above described front watching distance) is one example of the situation where "there is a possibility that the vehicle 1 departs from the driving lane".

As a result of the determination at the step S24, if it is determined that there is no possibility that the vehicle 1 departs from the driving lane (the step S24: No), the lane departure prevention operation illustrated in FIG. 2 is terminated. Therefore, processes from a step S25 to a step S29 that are performed when it is determined that there is a possibility that the vehicle 1 departs from the driving lane is not performed. Namely, the LDA controlling unit 172 controls the brake actuator 131 not to apply the prevention yaw moment to the vehicle 1 (namely, not to apply the braking force for applying the prevention yaw moment to the vehicle 1). Moreover, the LDA controlling unit 172 does not warn the driver that there is a possibility that the vehicle 1 departs from the driving lane.

If the lane departure prevention operation illustrated in FIG. 2 is terminated due to the determination that there is no possibility that the vehicle 1 departs from the driving lane, the ECU 17 may start the lane departure prevention operation illustrated in FIG. 2 again after a first predetermined period (for example, several milli seconds to several dozen milli second) has elapsed. Namely, the lane departure prevention operation illustrated in FIG. 2 is performed periodically with the first predetermined period. Note that the first predetermined period is a period corresponding to a default period with which the lane departure prevention operation illustrated in FIG. 2 is performed periodically.

On the other hand, as a result of the determination at the step S24, if it is determined that there is a possibility that the vehicle 1 departs from the driving lane (the step S24: Yes), the LDA controlling unit 172 warns the driver that there is a possibility that the vehicle 1 departs from the driving lane (a step S25). For example, the LDA controlling unit 172 may control the display 161 to display the image for informing that there is a possibility that the vehicle 1 departs from the driving lane. Alternatively, for example, the LDA controlling unit 172 may control the vibration actuator 142 in order to inform the driver by the vibration of the steering wheel 141 that there is a possibility that the vehicle 1 departs from the driving lane, in addition to or instead of controlling the display 161 as described above. Alternatively, for example, the LDA controlling unit 172 may control the speaker (what we call a buzzer) 162 in order to inform the driver by the alarm that there is a possibility that the vehicle 1 departs from the driving lane, in addition to or instead of controlling at least one of the display 161 and the vibration actuator 142 as described above.

If it is determined that there is a possibility that the vehicle 1 departs from the driving lane, furthermore, the LDA controlling unit 172 controls the brake actuator 131 to apply the braking force for applying the prevention yaw moment to the vehicle 1 (a step S26 to a step S29).

Specifically, if there is a possibility that the vehicle 1 departs from the driving lane, there is a high possibility that the vehicle 1 moves to be away from the center of the driving lane. Thus, if moving trajectory (in other words, moving locus) of the vehicle 1 is changed from current moving trajectory along which the vehicle 1 moves to be away from the center of the driving lane to new moving trajectory along which the vehicle 1 moves to approach the center of the driving lane, the departure of the vehicle 1 from the driving lane is prevented. Thus, the LDA controlling unit 172 calculates new moving trajectory along which the vehicle 1 that has moved to be away from the center of the driving lane will move to approach the center of the driving lane on the basis of the detection data, the image data, the detected white line, the calculated curvature radius R, the calculated lateral position X, the calculated lateral speed V1, the calculated departure angle θ and set allowable departure distance D. In this case, the LDA controlling unit 172 calculates new moving trajectory that satisfies the requirement of the allowable departure distance D set at the step S23. Furthermore, the LDA controlling unit 172 calculates, as target yaw rate $\gamma_{tgt}$, yaw rate that is predicted to occur (in other words, to be generated) in the vehicle 1 if the vehicle 1 moves along the calculated new moving trajectory (a step S26).

Then, the LDA controlling unit 172 calculates, as target yaw moment $M_{tgt}$, yaw moment that should be applied to the vehicle 1 to generate the target yaw rate $\gamma_{tgt}$ in the vehicle 1 (a step S27). Note that the target yaw moment $M_{tgt}$ is equivalent to the prevention yaw moment.

Then, the LDA controlling unit 172 calculates the braking forces that are allowed to apply the target yaw moment $M_{tgt}$ to the vehicle 1 (a step S28). In this case, the LDA controlling unit 172 calculates the braking force that is applied to each of the left front wheel 121FL, the left rear wheel 121RL, the right front wheel 121FR and the right rear wheel 121RR, separately. Then, the LDA controlling unit 172 calculates pressure command values that specify the hydraulic pressure that is necessary to generate the calculated braking forces (the step S28). In this case, the LDA controlling unit 172 calculates the pressure command value that specifies the hydraulic pressure in each of the wheel cylinder 122FL, the wheel cylinder 122RL, the wheel cylinder 122FR and the wheel cylinder 122RR, separately.

Figure 3:
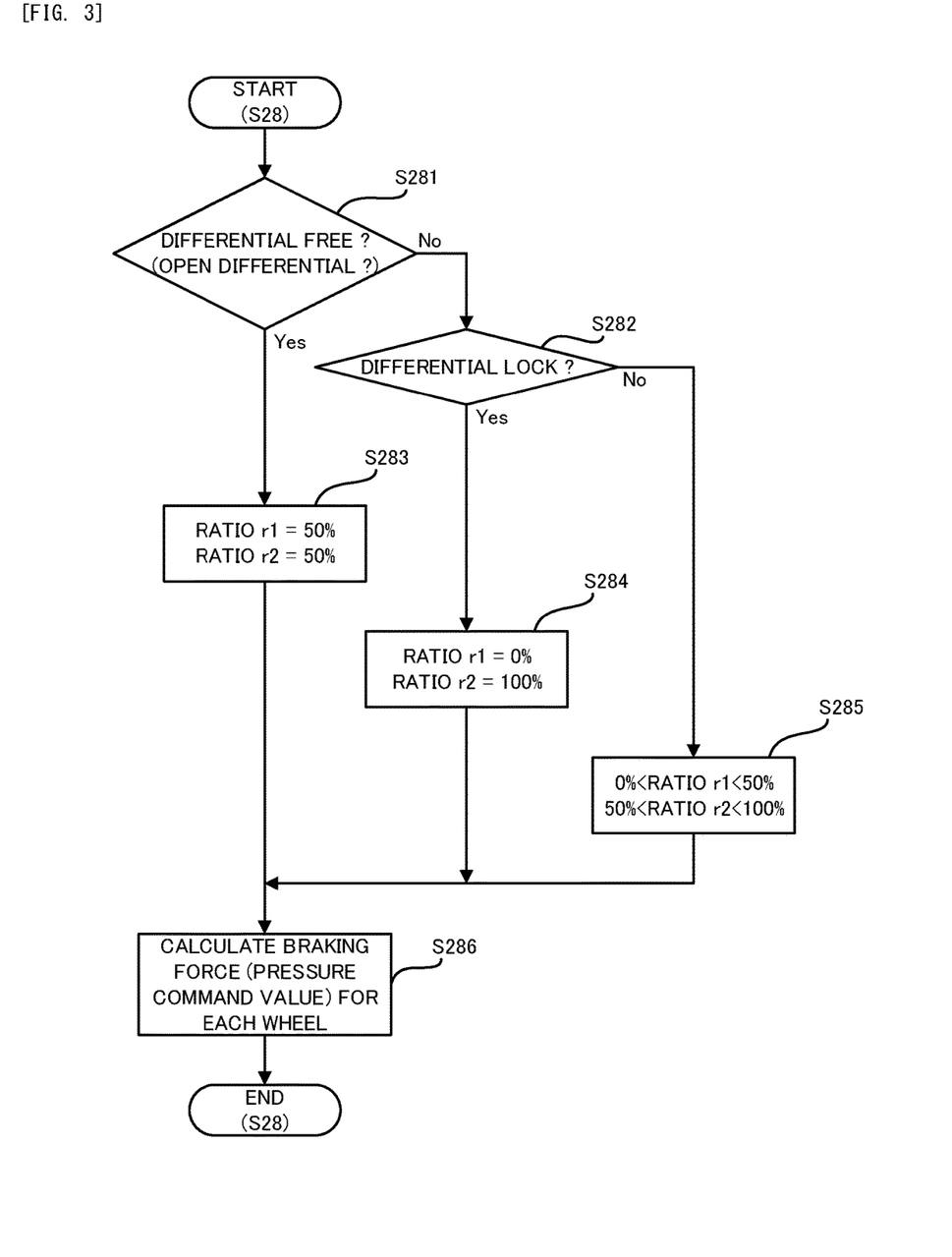
FIG. 3 is a flowchart that illustrates a flow of calculating braking forces (pressure command values) in the present embodiment.

Here, with reference to FIG. 3, the operation of calculating the braking forces (the pressure command values) at the step S28 in FIG. 2 will be described. As illustrated in FIG. 3, firstly, the ECU 17 sets the ratio r1 and the ratio r2 (a step S281 to a step S285). The ratio r1 is a ratio of the braking force applied to the driving wheels (namely, the left rear wheel 121RL and the right rear wheel 121RR) with respect to total braking force. Namely, the ratio r1 is a percentage of the braking force applied to the driving wheels with respect to the total braking force. The ratio r2 is a ratio of the braking force applied to the non-driving wheels (namely, the left front wheel 121FL and the right front wheel 121FR) with respect to the total braking force applied to the vehicle 1. Namely, the ratio r2 is a percentage of the braking force applied to the non-driving wheels with respect to the total braking force. Note that the total braking force is the braking force applied to the vehicle 1 (namely, the braking force applied to whole of the vehicle 1) and the total braking force is equivalent to a sum of the braking force applied to the driving wheels and the braking force applied to the non-driving wheels.

The magnitude (in other words, a strength) of the braking force applied to the left rear wheel 121RL is proportional to the magnitude of the hydraulic pressure transmitted to the wheel cylinder 122RL. The magnitude of the braking force applied to the right rear wheel 121RR is proportional to the magnitude of the hydraulic pressure transmitted to the wheel cylinder 122RR. The magnitude of the braking force applied to the left front wheel 121FL is proportional to the magnitude of the hydraulic pressure transmitted to the wheel cylinder 122FL. The magnitude of the braking force applied to the right front wheel 121FR is proportional to the magnitude of the hydraulic pressure transmitted to the wheel cylinder 122FR. Therefore, the ratio r1 is equivalent to a ratio (i.e. a distribution ratio) of the hydraulic pressure transmitted to the wheel cylinder 122RL and the wheel cylinder 122RR each of which corresponds to the driving wheel with respect to the hydraulic pressure in the master cylinder 112. Similarly, the ratio r2 is equivalent to a ratio (i.e. a distribution ratio) of the hydraulic pressure transmitted to the wheel cylinder 122FL and the wheel cylinder 122FR each of which corresponds to the non-driving wheel with respect to the hydraulic pressure in the master cylinder 112.

In order to set the ratio r1 and the ratio r2, the ratio controlling unit 173 determines whether or not the LSD 132 is in a differential free state (a step S281). The differential free state is a state where the differential rotation is allowed (in other words, is not limited) and may be referred to as an "open differential state", a "differential un-locked state" or a "differential rotation allowed state".

As a result of the determination at the step S281, if it is determined that the LSD 132 is in the differential free state (the step S281: Yes), the ratio controlling unit 173 sets each of the ratio r1 and the ratio r2 to 50% (a step S283). Namely, the ratio controlling unit 173 sets the ratio r1 and the ratio r2 so that the braking force applied to the driving wheel(s) is equal to the braking force applied to the non-driving wheel(s). In other words, the ratio controlling unit 173 sets the ratio r1 and the ratio r2 so that the hydraulic pressure transmitted to the wheel cylinder 122RL and the wheel cylinder 122RR each of which corresponds to the driving wheel is equal to the hydraulic pressure transmitted to the wheel cylinder 122FL and the wheel cylinder 122FR each of which corresponds to the non-driving wheel.

On the other hand, as a result of the determination at the step S281, if it is determined that the LSD 132 is not in the differential free state (the step S281: No), the ratio controlling unit 173 determines whether or not the LSD 132 is in a differential lock state (a step S282). The differential lock state is a state where the differential rotation is forbidden (namely, the left rear wheel 121RL and the right rear wheel 121RR are directly connected). In other words, the differential lock state is a state where the degree of the limitation of the differential rotation by the LSD 132 is the most (namely, the differential rotation is limited most greatly).

As a result of the determination at the step S282, if it is determined that the LSD 132 is in the differential lock state (the step S282: Yes), the ratio controlling unit 173 sets the ratio r1 to 0% and sets the ratio r2 to 100% (a step S284). Namely, the ratio controlling unit 173 sets the ratio r1 and the ratio r2 so that the braking force is applied only to the non-driving wheel(s) (namely, the braking force is not applied to the driving wheels). In other words, the ratio controlling unit 173 sets the ratio r1 and the ratio r2 so that the hydraulic pressure transmitted to the wheel cylinder 122RL and the wheel cylinder 122RR is equal to zero.

On the other hand, as a result of the determination at the step S282, if it is determined that the LSD 132 is not in the differential lock state (the step S282: No), it is estimated that the LSD 132 is in a state where the LSD 132 limits the differential rotation although the LSD 132 is not in the differential lock state (namely, the LSD 132 does not forbid the differential rotation).

In this case, the ratio controlling unit 173 sets the ratio r1 so that the ratio r1 is smaller than 50% (namely, the ratio r1 is smaller than the ratio r1 that is set when the LSD 132 is in the differential free state) and the ratio r1 is larger than 0% (namely, the ratio r1 is larger than the ratio r1 that is set when the LSD 132 is in the differential lock state) (a step S285). The total braking force that is necessary to apply the target yaw moment $M_{tgt}$ changes very little depending on the state of the LSD 132. Thus, the ratio controlling unit 173 sets the ratio r1 so that the braking force that is smaller than the braking force applied to the driving wheel(s) when the LSD 132 is in the differential free state and that is larger than the braking force applied to the driving wheel(s) when the LSD 132 is in the differential lock state is applied to the driving wheel(s). In other words, the ratio controlling unit 173 sets the ratio r1 so that the hydraulic pressure that is smaller than the hydraulic pressure transmitted to the wheel cylinder 122RL and the wheel cylinder 122RR when the LSD 132 is in the differential free state and that is larger than the hydraulic pressure transmitted to the wheel cylinder 122RL and the wheel cylinder 122RR when the LSD 132 is in the differential lock state is transmitted to the wheel cylinder 122RL and the wheel cylinder 122RR.

Moreover, the ratio controlling unit 173 sets the ratio r2 so that the ratio r2 is larger than 50% (namely, the ratio r2 is larger than the ratio r2 that is set when the LSD 132 is in the differential free state) and the ratio r2 is smaller than 100% (namely, the ratio r2 is smaller than the ratio r2 that is set when the LSD 132 is in the differential lock state) (the step S285). Since the total braking force that is necessary to apply the target yaw moment $M_{tgt}$ changes very little depending on the state of the LSD 132 as described above, the ratio controlling unit 173 sets the ratio r2 so that the braking force that is larger than the braking force applied to the non-driving wheel(s) when the LSD 132 is in the differential free state and that is smaller than the braking force applied to the non-driving wheel(s) when the LSD 132 is in the differential lock state is applied to the non-driving wheel(s). In other words, the ratio controlling unit 173 sets the ratio r2 so that the hydraulic pressure that is larger than the hydraulic pressure transmitted to the wheel cylinder 122FL and the wheel cylinder 122FR when the LSD 132 is in the differential free state and that is smaller than the hydraulic pressure transmitted to the wheel cylinder 122FL and the wheel cylinder 122FR when the LSD 132 is in the differential lock state is transmitted to the wheel cylinder 122FL and the wheel cylinder 122FR.

Figure 4:
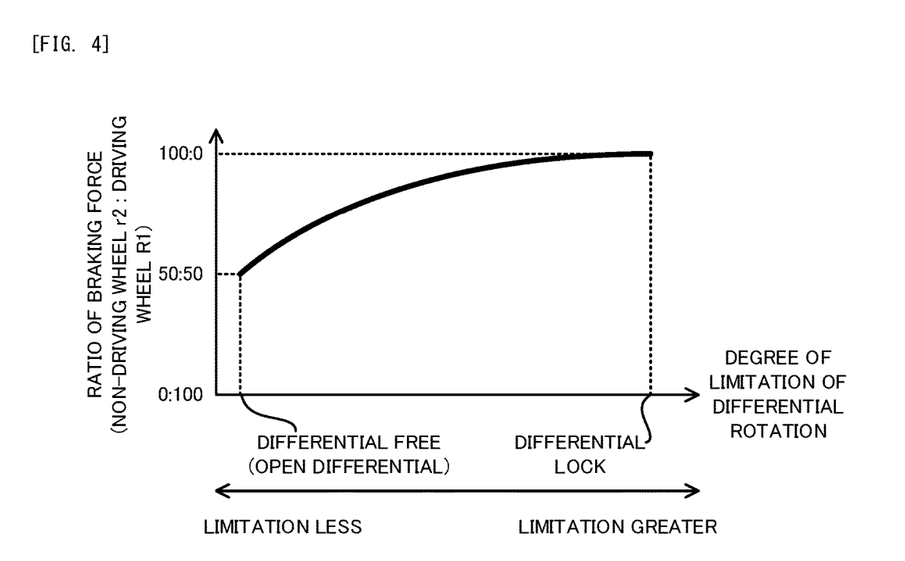
FIG. 4 is a graph that illustrates one example of a relationship between a degree of limitation of differential rotation by a LSD (Limited Slip Differential) and each of the braking force applied to driving wheels and the braking force applied to non-driving wheels.

At the step S285, it is preferable that the ratio controlling unit 173 set the ratio r1 and the ratio r2 on the basis of the degree of the limitation of the differential rotation by the LSD 132. Specifically, it is preferable that the ratio controlling unit 173 set the ratio r1 so that the ratio r1 decreases more (in other words, becomes smaller) as the degree of the limitation of the differential rotation by the LSD 132 is greater (in other words, as the LSD 132 limits the differential rotation more greatly). On the other hand, it is preferable that the ratio controlling unit 173 set the ratio r2 so that the ratio r2 increases more (in other words, becomes larger) as the degree of the limitation of the differential rotation by the LSD 132 is greater (in other words, as the LSD 132 limits the differential rotation more greatly). In this case, the ratio controlling unit 173 may set the ratio r1 and the r2 on the basis of a map that represents a relationship between the degree of the limitation of the differential rotation by the LSD 132 and each of the ratio r1 and the ratio r2, for example. FIG. 4 illustrates one example of the map.

Note that FIG. 4 illustrates one example of the map in which the ratio r1 sequentially decreases and the ratio r2 sequentially increases as the degree of the limitation of the differential rotation by the LSD 132 is greater. However, the ratio controlling unit 173 may set the ratio r1 and the ratio r2 on the basis of a map in which the ratio r1 decreases in a stepwise manner and the ratio r2 increases in a stepwise manner as the degree of the limitation of the differential rotation by the LSD 132 is greater. In this case, the ratio controlling unit 173 may set the ratio r1 so that the ratio r1 is equal to or smaller than 50% (namely, the ratio r1 is equal to or smaller than the ratio r1 that is set when the LSD 132 is in the differential free state) and the ratio r1 is equal to or larger than 0% (namely, the ratio r1 is equal to or larger than the ratio r1 that is set when the LSD 132 is in the differential lock state), if the LSD 132 is not in the differential lock state and the differential free state. Similarly, the ratio controlling unit 173 sets the ratio r2 so that the ratio r2 is equal to or larger than 50% (namely, the ratio r2 is equal to or larger than the ratio r2 that is set when the LSD 132 is in the differential free state) and the ratio r2 is equal to or smaller than 100% (namely, the ratio r2 is equal to or smaller than the ratio r2 that is set when the LSD 132 is in the differential lock state), if the LSD 132 is not in the differential lock state and the differential free state.

Then, the LDA controlling unit 172 calculates the braking force that is applied to each of the left front wheel 121FL, the left rear wheel 121RL, the right front wheel 121FR and the right rear wheel 121RR, separately (a step S286). In which case, the LDA controlling unit 172 calculates the braking forces that are allowed to apply the target yaw moment $M_{tgt}$ and that satisfies the requirement of the ratio r1 and the ratio r2. Then, the LDA controlling unit 172 calculates the pressure command values that specify the hydraulic pressure that is necessary to generate the calculated braking forces (the step S286). In this case, the LDA controlling unit 172 calculates the pressure command value that specifies the hydraulic pressure in each of the wheel cylinder 122FL, the wheel cylinder 122RL, the wheel cylinder 122FR and the wheel cylinder 122RR, separately.

For example, if it is determined that there is a possibility that the vehicle 1 departs from the driving lane to get across the white line that is located at the right side with respect to the moving direction of the vehicle 1, the prevention yaw moment that is allowed to turn the vehicle 1 toward the left with respect to the moving direction of the vehicle 1 is preferably applied in order to prevent the vehicle 1 from departing from the driving lane. In this case, the prevention yaw moment that is allowed to turn the vehicle 1 toward the left is applied to the vehicle 1 by applying the braking force to at least one of the left front wheel 121FL and the left rear wheel 121RL and not applying the braking force to each of the right front wheel 121FR and the right rear wheel 121RR, or by applying the relatively small braking force to at least one of the right front wheel 121FR and the right rear wheel 121RR and applying the relatively large braking force to at least one of the left front wheel 121FL and the left rear wheel 121RL. On the other hand, if it is determined that there is a possibility that the vehicle 1 departs from the driving lane to get across the white line that is located at the left side with respect to the moving direction of the vehicle 1, the prevention yaw moment that is allowed to turn the vehicle 1 toward the right with respect to the moving direction of the vehicle 1 is preferably applied to the vehicle 1 by applying the braking force to at least one of right front wheel 121FR and the right rear wheel 121RR and not applying the braking force to each of the left front wheel 121FL and the left rear wheel 121RL, or by applying the relatively small braking force to at least one of the left front wheel 121FL and the left rear wheel 121RL and applying the relatively large braking force to at least one of the right front wheel 121FR and the right rear wheel 121RR.

Namely, in the present embodiment, the LDA controlling unit 172 is configured to apply the prevention yaw moment by using a difference of the braking forces between left wheels that include the left front wheel 121FL and the left rear wheel 121RL and right wheels that includes the right front wheel 121FR and the right rear wheel 121RR.

Again in FIG. 2, then, the LDA controlling unit 172 controls the brake actuator 131 on the basis of the pressure command values calculated at the step S28. Therefore, the braking force based on the pressure command value is applied to at least one of the left front wheel 121FL, the left rear wheel 121RL, the right front wheel 121FR and the right rear wheel 121RR (a step S29). As a result, the prevention yaw moment that is equivalent to the target yaw moment $M_{tgt}$ is applied to the vehicle 1, and thus the departure of the vehicle 1 from the driving lane is prevented.

(3) Technical Effect of Departure Prevention Operation in Present Embodiment

According to the vehicle 1 in the present embodiment, the prevention yaw moment is applied to the vehicle 1 if there is a possibility that the vehicle 1 departs from the driving lane. Thus, the departure of the vehicle 1 from the driving lane is prevented.

Moreover, in the present embodiment, the ratio r1 becomes smaller and the ratio r2 becomes larger when the prevention yaw moment is applied and the LSD 132 limits the differential rotation, compared to a case where the prevention yaw moment is applied and the LSD 132 does not limit the differential rotation. Thus, it is possible to perform the departure prevention operation for preventing the vehicle 1 having the LSD 132 from departing from the driving lane. In the following description, the reason why the departure prevention operation is performed on the vehicle 1 having the LSD 132 will be described by using an example in which the prevention yaw moment that is allowed to turn the vehicle 1 toward the left with respect to the moving direction of the vehicle 1 is applied to the vehicle 1.

As described above, the LDA controlling unit 172 is allowed to apply the prevention yaw moment that is allowed to turn the vehicle 1 toward the left by performing a first operation of applying the braking force to at least one of the left front wheel 121FL and the left rear wheel 121RL and not applying the braking force to each of the right front wheel 121FR and the right rear wheel 121RR. Here, when the differential rotation is not limited, the braking force is not applied to the right rear wheel 121RR even if the braking force is applied to the left rear wheel 121RL. On the other hand, when the differential rotation is limited, applying the braking force to the left rear wheel 121RL results in applying the braking force to the right rear wheel 121RR. As a result, the undesired braking force is applied to the right rear wheel 121RR to which the braking force should not be applied. Thus, there is a possibility that the undesired yaw moment different from the prevention yaw moment that should be applied to the vehicle 1 is actually applied to the vehicle 1.

However, in the present embodiment, the ratio r1 of the braking force that is applied to the left rear wheel 121RL is set to be relative small, when the differential rotation is limited. Thus, the braking force that is smaller than desired braking force (namely, the braking force that should be applied when the differential rotation is not limited) necessary to apply the prevention yaw moment is applied to the left rear wheel 121RL. Thus, undesired braking force that is large to prevent the desired prevention yaw moment from being applied is not likely applied to the right rear wheel 121RR.

On the other hand, when the differential rotation is limited, the decreased braking force is applied to the left rear wheel 121RL, because the ratio 1 decreases. Thus, there is a possibility that the total braking force decreases (in other words, the total braking force lacks) if only the ratio r1 decreases. Thus, there is still a possibility that the desired prevention yaw moment is not applied to the vehicle 1. Namely, there is a possibility that the difference of the braking forces that are allowed to generate the desired prevention yaw moment is not generated between the right wheels and the left wheels. However, in the present embodiment, when the differential rotation is limited, the ratio controlling 173 increases the ratio r2 (in other words, the ratio r2 is set to be relatively large) in response to decreasing the ratio r1, in order to generate the desired difference of the braking forces by compensating the decrease of the braking force applied to the left rear wheel 121RL. As a result, the braking force that is larger than desired braking force (namely, the braking force that should be applied when the differential rotation is not limited) necessary to apply the prevention yaw moment is applied to the left front wheel 121FL. As a result, the total braking force (namely, the braking force applied to whole of the left wheels) is kept to be constant, even if the decreased braking is applied to the left rear wheel 121RL and the increased braking force is applied to the left front wheel 121RL. As a result, the desired difference of the braking forces that is allowed to generate the desired prevention yaw moment is generated between the right wheels and the left wheels. Namely, the desired prevention yaw moment is applied to the vehicle 1.

Alternatively, as described above, the LDA controlling unit 172 is allowed to apply the prevention yaw moment that is allowed to turn the vehicle 1 toward the left by performing a second operation of applying the relatively small braking force (in the following description, this force is referred to as a "braking force having a first magnitude") to at least one of the right front wheel 121FR and the right rear wheel 121RR and applying the relatively large braking force (in the following description, this force is referred to as a "braking force having a second magnitude") to at least one of the left front wheel 121FL and the left rear wheel 121RL. Even in this case, if the LDA controlling unit 172 performs a first control for applying the braking force having the first magnitude to the right rear wheel 121RR when the differential rotation is limited, not only the braking force having the first magnitude that is generated by the first control but also undesired braking force that is generated by a second control are applied to the right rear wheel 121RR, wherein the second control is a control for applying the braking force having the second magnitude to the left rear wheel 121RL. Similarly, if the LDA controlling unit 172 performs the second control for applying the braking force having the second magnitude to the left rear wheel 121RL when the differential rotation is limited, not only the braking force having the second magnitude that is generated by the second control but also undesired braking force that is generated by the first control are applied to the left rear wheel 121RL. Thus, there is a possibility that the undesired yaw moment different from the prevention yaw moment that should be applied to the vehicle 1 is actually applied to the vehicle 1. However, in the present embodiment, the ratio r1 is set to be relative small and the ratio r2 is set to be relatively large, when the differential rotation is limited. Namely, the desired prevention yaw moment is applied to the vehicle 1 even in the case where the second operation is performed, as with the above described case where the first operation is performed.

Therefore, according to the present embodiment, it is possible to perform the departure prevention operation for preventing the vehicle 1 having the LSD 132 from departing from the driving lane.

Moreover, in the present embodiment, the ratio r1 becomes smaller and the ratio r2 becomes larger more as the degree of the limitation of the differential rotation by the LSD 132 is greater. Here, as the degree of the limitation of the differential rotation by the LSD 132 is greater, the braking force applied to the right rear wheel 121RR due to the operation of applying the braking force to the left rear wheel 121RL becomes larger, if the ratio r1 is constant regardless of the degree of the limitation of the differential rotation by the LSD 132. As a result, there is higher possibility that the undesired braking force that is large to prevent the desired prevention yaw moment from being applied to the vehicle 1 is applied to the right rear wheel 121RR, as the degree of the limitation of the differential rotation by the LSD 132 is greater, if the ratio r1 is constant regardless of the degree of the limitation of the differential rotation by the LSD 132. However, in the present embodiment, since the ratio r1 decreases (in other words, become smaller) as the degree of the limitation of the differential rotation by the LSD 132 is greater, it is possible to suppress the increase of the braking force applied to the right rear wheel 121RR due to the operation of applying the braking force to the left rear wheel 121RL. Namely, it is possible to suppress the increase of the braking force based on the degree of the limitation of the differential rotation by the LSD 132. Therefore, it is possible to apply the more desired prevention yaw moment to the vehicle 1.

Incidentally, in the above described embodiment, (i) the ratio controlling unit 173 sets the ratio r1 to 50% when the LSD 132 is in the differential free state, (ii) the ratio controlling unit 173 sets the ratio r1 to 0% when the LSD 132 is in the differential lock state and (iii) the ratio controlling unit 173 sets the ratio r1 to the value that is smaller than 50% and larger than 0% when the LSD 132 is not in the differential free state and the differential lock state. However, (i) the ratio controlling unit 173 may set the ratio r1 to any first value when the LSD 132 is in the differential free state, (ii) the ratio controlling unit 173 may set the ratio r1 to any second value that is smaller than the first value when the LSD 132 is in the differential lock state and (iii) the ratio controlling unit 173 may set the ratio r1 to any third value that is equal to or smaller than the first value and that is equal to or larger than the second value when the LSD 132 is not in the differential free state and the differential lock state. Similarly, (i) the ratio controlling unit 173 may set the ratio r2 to any fourth value when the LSD 132 is in the differential free state, (ii) the ratio controlling unit 173 may set the ratio r2 to any fifth value that is larger than the fourth value when the LSD 132 is in the differential lock state and (iii) the ratio controlling unit 173 may set the ratio r2 to any sixth value that is equal to or larger than the fourth value and that is equal to or smaller than the fifth value when the LSD 132 is not in the differential free state and the differential lock state.

Note that the vehicle 1 may have any differential apparatus that is configured to allow the differential rotation between the left rear wheel 121RL and the right rear wheel 121RR and to limit this differential rotation when the specific condition is satisfied, in addition to or instead of the LSD 132. For example, the vehicle 1 may have, as the differential apparatus, a differential gear including a differential lock mechanism. In this case, the differential apparatus is in the differential lock state when the differential lock mechanism operates and the differential apparatus is in the differential free state when the differential lock mechanism does not operate. Thus, even in this case, the ratio r1 and the ratio r2 may be set by the above described operation illustrated in FIG. 3.

Moreover, the above described description uses an example in which the vehicle 1 is the rear wheel drive vehicle. However, the above described departure prevention operation may be performed even in the case where the vehicle 1 is a front wheel drive vehicle. However, in this case, each of the left rear wheel 121RL and the right rear wheel 121RR is the non-driving wheel and each of the left front wheel 121FL and the right front wheel 121FR is the driving wheel.

At least one portion of the feature in the above described embodiment may be eliminated or modified accordingly. At least one portion of the feature in the above described embodiment may be combined with at least another one portion of the feature in the above described embodiment.

This application is based upon and claims the benefit of priority of the prior Japanese Patent Application No. 2017-016612, filed on Feb. 1, 2017, the entire contents of which are incorporated herein by reference. In addition, the entire contents of the above described Patent Literatures 1 to 2 is incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A lane departure prevention apparatus, which involve such changes, are also intended to be within the technical scope of the present invention.

REFERENCE SIGNS LIST 1 vehicle
111 brake pedal
112 master cylinder
113FL, 113RL, 113FR, 113RR brake pipe
121FL left front wheel
121RL left rear wheel
121FR right front wheel
121RR right rear wheel
122FL, 122RL, 122FR, 122RR wheel cylinder
131 brake actuator
132 LSD
141 steering wheel
142 vibration actuator
151 vehicle speed sensor
152 wheel speed sensor
153 yaw rata sensor
154 acceleration sensor
155 camera
161 display
162 speaker
17 ECU (Electronic Control Unit)
171 data correcting unit
172 LDA controlling unit
173 ratio controlling unit
Vv vehicle speed
Vw wheel speed
Vl lateral speed
$\gamma$ yaw rate
$\gamma_{tgt}$ target yaw rate
$M_{tgt}$ target yaw moment
$\theta$ departure angle
G, Gx, Gy acceleration
r1, r2 ratio
R curvature radius X lateral position
Xf future lateral position
D allowable departure distance

The invention claimed is:

1. A lane departure prevention apparatus that is configured to perform a departure prevention operation for preventing a vehicle from departing from a driving lane on which the vehicle is currently traveling, the vehicle including:
a plurality of wheels that includes a right driving wheel, a left driving wheel, a right non-driving wheel and a left non-driving wheel, each of the right driving wheel and the left driving wheel is a driving wheel to which a driving power is transmitted from a power source, each of the right non-driving wheel and the left non-driving wheel is a non-driving wheel to which the driving power is not transmitted from the power source;
a braking apparatus that is configured to apply braking force to each of the plurality of wheels; and
a differential apparatus that is configured to allow a differential rotation between the right driving wheel and the left driving wheel and to limit the differential rotation when a specific condition is satisfied,
the lane departure apparatus including a controller,
the controller being programmed to:
control the braking apparatus to perform the departure prevention operation by applying yaw moment to the vehicle, the yaw moment being generated by a difference of the braking forces between right wheels and left wheels, the right wheels including the right driving wheel and the right non-driving wheel, the left wheels including the left driving wheel and the left non-driving wheel; and
control a first ratio that is a ratio of the braking force applied to the driving wheels with respect to the braking force applied to the vehicle and a second ratio that is a ratio of the braking force applied to the non-driving wheels with respect to the braking force applied to the vehicle so that the first ratio becomes smaller and the second ratio becomes larger when the departure prevention operation is performed and the differential apparatus limits the differential rotation, compared to a case where the departure prevention operation is performed and the differential apparatus does not limit the differential rotation.

2. The lane departure prevention apparatus according to claim 1, wherein
the controller is further programmed to control the first ratio and the second ratio so that the first ratio becomes smaller and the second ratio becomes larger as the differential apparatus limits the differential rotation more greatly.

* * * * *